United States Patent [19]

Mergard

[11] Patent Number: 5,996,051
[45] Date of Patent: Nov. 30, 1999

[54] COMMUNICATION SYSTEM WHICH IN A FIRST MODE SUPPORTS CONCURRENT MEMORY ACCESES OF A PARTITIONED MEMORY ARRAY AND IN A SECOND MODE SUPPORTS NON-CONCURRENT MEMORY ACCESSES TO THE ENTIRE MEMORY ARRAY

[75] Inventor: James O. Mergard, Pflugerville, Tex.

[73] Assignee: Advanced Micro Devices, Inc.

[21] Appl. No.: 08/837,119

[22] Filed: Apr. 14, 1997

[51] Int. Cl.⁶ .................................................. G06F 12/00
[52] U.S. Cl. ...................... 711/147; 711/168; 711/150; 711/151; 711/152; 711/173; 711/149; 710/14; 710/37; 710/21; 710/240
[58] Field of Search ................................ 711/168, 5, 105, 711/147, 148, 149, 150, 151, 152, 153, 154, 173, 129, 130, 146

[56] References Cited

U.S. PATENT DOCUMENTS

| | | | |
|---|---|---|---|
| 5,418,744 | 5/1995 | Taoda | 365/198.05 |
| 5,636,361 | 6/1997 | Ingerman | 395/477 |
| 5,671,392 | 9/1997 | Parris et al. | 395/475 |
| 5,682,512 | 10/1997 | Tetrick | 395/412 |
| 5,684,977 | 11/1997 | Van Loo et al. | 395/470 |
| 5,706,478 | 1/1998 | Dye | 395/503 |
| 5,761,281 | 6/1998 | Baum et al. | 379/93.29 |
| 5,761,727 | 6/1998 | Wu et al. | 711/147 |
| 5,761,728 | 6/1998 | Saito et al. | 711/147 |
| 5,781,927 | 7/1998 | Wu et al. | 711/151 |

*Primary Examiner*—Eddie P. Chan
*Assistant Examiner*—Kimberly McLeon
*Attorney, Agent, or Firm*—Kevin L. Daffer; Mark L. Berrier; Conley, Rose & Tayon

[57] ABSTRACT

A communication system is provided that includes a mechanism for selectively addressing memory banks depending upon the configuration of that system. The communication system can therefore operate in accordance with two possible modes of operation. According to a first mode, the local CPU can access one set of memory banks concurrent with an external device accessing the other set of memory banks. According to a second mode of operation, either the local CPU can access the memory banks or an external device can access the memory banks, one exclusive of the other. In one version of the second mode of operation, address signals to the memory banks can be physically connected leaving signals free to be used as general purpose input/output signals. The mechanism by which memory banks can be addressed and data transferred to and from those banks readily lends itself to communication applications to which the present system may be attributed.

13 Claims, 4 Drawing Sheets

COMMUNICATION SYSTEM WHICH IN A FIRST MODE SUPPORTS CONCURRENT MEMORY ACCESES OF A PARTITIONED MEMORY ARRAY AND IN A SECOND MODE SUPPORTS NON-CONCURRENT MEMORY ACCESSES TO THE ENTIRE MEMORY ARRAY

BACKGROUND OF THE INVENTION

1. Field of the Invention

The present invention relates to a memory controller which might be implemented in various ways such as, for example, in communication system architecture. The memory controller can be selectively configured to allow concurrent DMA and CPU accesses to memory or non-concurrent CPU access only.

2. Description of the Related Art

A recent trend in the modern work place is for individuals to work at remote sites and periodically connect to an office or central data site. Those individuals are often termed "telecommuters", and are defined as workers or employees who work from a remote site within their home, that site being connected to the central, corporate office. Another recent trend in the workplace is that of remote small offices or branch offices, wherein a group of workers or employees are situated in a location remote from the corporate headquarters. Those individuals are also electronically connected to the corporate office/headquarters. This movement away from the corporate or central site, and the benefit gained by avoiding a physical commute appears to be a trend which is here to stay. In all likelihood, this trend will continue given the transient nature by which most modern workers operate.

Remotely situated workers require transparent connectivity not only to the corporate office but also to the office's local area network (LAN). As corporations move away from mainframe based systems to personal computer (PC) based systems linked together by LANs, the options for remote connectivity have improved. In general, PCs and LANs facilitate remote access to the computing resources of the corporate office or corporate headquarters. Remote connectivity is also made possible with the arrival of affordable, reliable, digital telecommunications services and inexpensive network hardware. Currently, a variety of digital telecommunications services now support remote connections to enterprise networks, among these being Frame Relay Integrated Service Digital Network (ISDN), asynchronous transfer mode (ATM), digital data service and T1, among others.

Recent advances allow modern communication systems to handle increasingly large amounts of data. Those communications systems are many times required to accommodate integrated services, such as voice, data and video, on a single communication medium. Data provided through a communications system can either be isochronous or real-time. The communication system is correspondingly required to maintain a desired level of throughput or data transfer in order to guarantee real-time delivery of, for example, audio and/or video.

As with computer systems, communication systems generally comprise various logic components connected by one or more system busses. Those busses provide a transfer path for control and data information between each of the various logic components. In many systems, the system bus becomes a bottleneck for the transfer of data between the various logic components. Therefore, an improved system and method is desired which provides more efficient bus utilization for increased data throughput. That throughput is highly desirable in communication systems which must transfer large amounts of data in, for example, real time.

An important aspect of throughput is control of data to and from a memory media. For example, it may be desirable to utilize a communications system having a dynamic random access memory (DRAM). It would be further desirous to transfer data to and from the memory from various bus masters, i.e., bus masters being those which obtain mastership of the system bus. For example, a modern communications system may call upon data transfer from a remote site as well as data transfer from the local PC's CPU. That data transfer occurs to and from the DRAM with rapidity. It would therefore be desirable to employ a memory controller within the communications system which can provide more efficient data transfer between the local DRAM and both the local CPU as well as a local bus master controller linked, for example, to a computer located remote from the local CPU.

Accordingly, an improvement must be made by which concurrent or non-concurrent data transfers can take place between the local DRAM and the local CPU and/or a remote computer. Those data transfers must be performed in such a way that a bottleneck on the system bus and/or DRAM interface bus is substantially avoided.

SUMMARY OF THE INVENTION

The problems outlined above are in large part solved by a memory controller employed in any high-level system architecture (e.g., communication system), whereby the memory controller can achieve more efficient bus utilization for higher data throughput. If used within a communication system, the communication system may include various logic devices connected to a system bus. The communication system intelligently utilizes unused system bus bandwidth for improved performance. More specifically, the communication system transfers data to and from the DRAM memory array, regardless of whether the system bus master is the local computer or a computer located at a site remote from the local computer.

The communications system includes a centralized computing system to which various remote users (i.e. computers) can gain access. The central computing system includes a receive buffer, a DRAM memory, a local CPU, a direct memory access (DMA) controller, and a bus arbiter each of which are preferably coupled to the system bus. The DMA controller effectuates direct access to the DRAM memory of information sent by a remote user. According to one embodiment, in a first mode the DMA controller can access the DRAM memory concurrent with the local CPU access. In a second mode, the DMA controller accesses DRAM memory non-concurrent with local CPU access. In the former instance, data throughput to the memory occurs during times when both remote users and local users require memory access. In the later instance, data throughput need not be jeopardized if the local CPU is a more modern 32-bit processor employing, for example, a cache system. As such, the present communication system, and more specifically, the local central computer architecture is adaptable to earlier microprocessor architectures or the more recent microprocessor architectures.

If the local CPU employs a cache system, the cache memory is typically coupled between the local CPU and the system bus and stores frequently used code and data used by the local CPU. During times when the local CPU is retrieving data from the cache system, the CPU is not required to access the system bus and therefore does not cause bottleneck on that bus. Therefore, remote access to the system bus, and more specifically, the DRAM memory can occur regardless of the CPU vintage.

The system architecture may also include a bus arbiter coupled to the DMA controller as well as the local CPU. The bus arbiter arbitrates for control of the system bus by the requesting devices, e.g., the local CPU or DMA controller. Once a bus request occurs, the bus arbiter then allocates control of that bus according to a desired arbitration scheme.

The present system architecture may allow the DMA controller to perform transfers from the buffer to the DRAM memory during at least two instances. First, DMA transfers can occur when the CPU is operating out of its cache system as described above. This assumes arbitration and control accesses occur exclusively from either the DMA controller or the local CPU. This is a preferable case whenever the local CPU is a modern microprocessor employing cache architecture. However, transfers can occur in another way. Thus, a second transfer method allows concurrent accesses by both the DMA controller and the local CPU. In this instance, arbitration between the local CPU and DMA controller is not needed, and the DRAM controller linked to the system bus allocates local CPU access to lower banks of the DRAM memory while the DRAM controller concurrently allows DMA access to upper memory banks of the DRAM memory. When the amount of data stored in the buffer memory rises above a critical threshold, a DMA transfer request guarantees use of the bus for DMA transfers either by gaining mastership of the bus and then accessing the DRAM or by concurrently accessing the DRAM, depending upon the mode of operation. DMA transfers in this fashion, regardless of local CPU architecture, help prevent FIFO overruns.

Broadly speaking, the present invention contemplates any high level system architecture, such as a communications system, which employs a more flexible memory access methodology. The communication system may include a local computer network coupled to a public switched telephone network (PSTN) for connecting computer systems situated at remote sites to the local computer network. The communications system further comprises a router interposed between the PSTN and the local computer network. The router includes a pair of bus masters coupled to a system bus for transferring data between the pair of bus masters and the system bus.

Although the present invention is described as being utilized in conjunction with a communications system, the present invention may be applied to any computer architecture where two or more devices must compete for access to memory. Instead of an embodiment with a CPU and a communications bus master as the devices competing for access to memory, the invention could apply to architectures with other types of bus masters, such as a drive array controller or graphics controller competing with the CPU for memory access.

A memory controller is central to the present, flexible memory access technique. The memory controller is coupled between the system bus and a pair of memory banks for transferring data between one of the bus masters and one of the pair of memory banks while concurrently transferring data between another of the bus masters and another of the pair of memory banks. This concurrent operation mode is preferably used when the local CPU is a 16-bit CPU with no cache. In this instance, one bank is "dedicated" to the CPU, while the other bank is arbitrated for by the other bus master and the CPU. This results in concurrency, because the DMA controller may access memory simultaneously with the CPU executing from its own dedicated DRAM memory bank. The DMA or bus master cannot access the CPU's dedicated bank; however, the CPU can access the non-dedicated bank and, when so doing, locks out the DMA. In the concurrent mode of operation, the memory controller is configured to transfer data concurrently between the pair of memory banks and respective CPU bus master and another (CPU or non-CPU) bus master.

The present memory access methodology also contemplates a non-concurrent memory access mode. Non-concurrent operation is preferably used when the local CPU is a 32-bit CPU with cache. In this instance, the memory controller will dedicate all 32-bits to single non-concurrent bus transfers, either to/from the CPU or the DMA/bus master. In this case, only the CPU or DMA/bus master can transfer at any one time. Also, unused signals that were used for memory control (such as MA[*] bus and $\overline{MWE}$) for the second array in the concurrent mode, can be used as programmable I/O signals in the non-concurrent mode.

By utilizing memory banks, and partitioning those memory banks from one another, data throughput to and from DRAM memory can be enhanced. However, data throughput enhancement is achieved by paying particular attention to separate lower and upper memory bank controllers. In the concurrent mode the lower memory bank controller controls address signals and control signals for all local CPU accesses. Conversely, the upper memory bank controller controls address signals and control signals whenever access is requested from either the local CPU or the DMA controller. In non-concurrent mode, the lower and upper bank controllers may work together to provide the memory control signals. For example, the address, memory write enable, and column address strobe signals from the lower bank controller may be used for both banks and the upper bank controller may provide separate row address strobe signals for the upper bank. Thus, 16-bit memory banks in both the upper and lower banks can be accessed together by a single 32-bit CPU master. While the present invention is described in terms of 16-bit and 32-bit devices, it is understood that the invention may be applied to other sizes as well. For example, 32-bit or 64-bit devices may be supported by extending the invention.

During non-concurrent load operation, a single set of memory access signals are generated in possibly two ways. First, the lower memory address signals may be multiplexed to the upper memory address signals such that no external memory connection modification is needed for the memory configuration established when concurrent mode operation is used. Alternatively, or according to a second connection scheme, the upper memory address signals may be physically (i.e., hardwire) connected to the lower memory address signals. In this instance, what were previously the upper memory address and write enable signals are now available to use as general purpose input/output (GPIO) signals. The upper memory address signals, in conjunction with the upper write enable signal can therefore be reserved, for example, to possibly fourteen GPIO signals.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERED EMBODIMENTS

Figure 1:
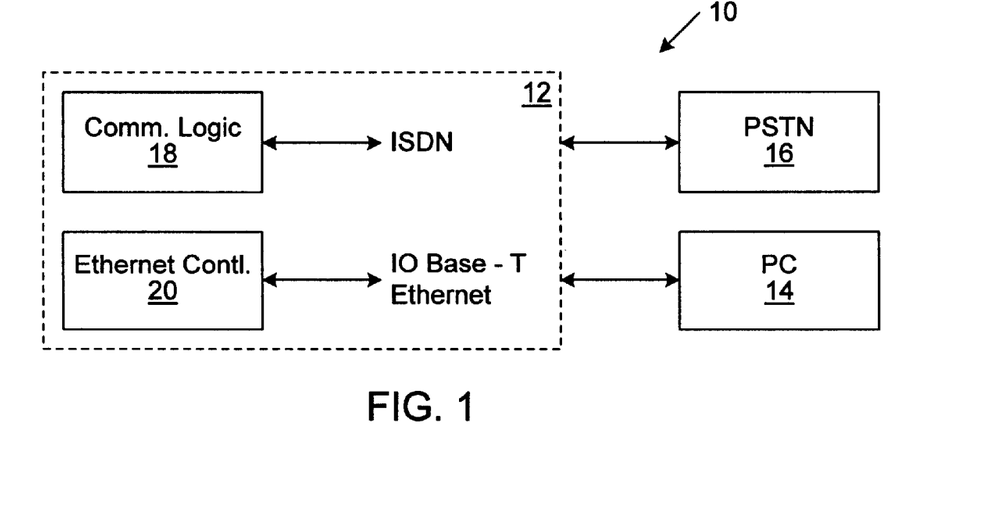
FIG. 1 is a block diagram of a communications system employing a router linker between a PSTN and a LAN for improving bus utilization according to the present invention.

Referring now to FIG. 1, the communication system 10 which incorporates the preferred embodiments of the present invention is shown. FIG. 1 illustrates a router 12 which connects to one or more networked computer systems 14 and which is operable to connect to the public switched telephone network (PSTN) 16. Router 12 includes communication logic 18 which provides more efficient bus utilization according to one embodiment hereof. It is noted that router 12 is remote from PSTN 16 and the various remote users linkable thereto. Accordingly, router 12 and, more specifically, communication logic 18 employs a local CPU attributable to the network, possibly associated with system 14. A remote CPU linkable via PSTN 16 is therefore separate from the local CPU henceforth defined.

Router 12 interfaces to at least one computer system and preferably a network of computer systems 14. Router 12 may be configured to interface to any of various types of computer systems or networks. Thus, one or more of the networked computer systems 14 connect through router 12 to PSTN 16 using, for example, various protocols.

Router 12 operates to route messages across different networks with different topologies. Router 12 also preferably performs gateway functions, i.e., router 12 includes logic for translating between different protocols. Thus, router 12 provides gateway linkage between a local area network and a completely different network type using a different transfer protocol. This enables, for example, a network to connect to a mainframe. More specifically, this allows a Novell network using NETBEUI to interface to a TCP/IP network, such as a Unix network or the Internet. Thus, router 12 operates at the bottom three layers of the open system interconnection (OSI) model. Router 12 is shown in FIG. 1 to connect through PSTN 16. However, router 12 may also be adapted to couple to an asynchronous transfer mode (ATM) network, a fiber distributed data interface (FDDI) network, an X.25 network, a synchronous optical network (SONET), or other types of communication media, as desired.

According to a preferred embodiment, communication logic 18 presents an ISDN interface for coupling to PSTN 16. Communication logic 18 thereby involves logic for providing more efficient bus utilization and transfer of data to and from DRAM memory associated with logic 18. Transfer occurs across communication system 10 to and from DRAM memory via PSTN 16 or network 14.

Router 12 also preferably includes an Ethernet controller 24 coupling to an Ethernet local area network. As shown, Ethernet controller 20 couples through a communication media to the LAN, represented by the networked PC 14. Ethernet controller 20 is adapted to provided to 10Base-T Ethernet connection.

Figure 2:
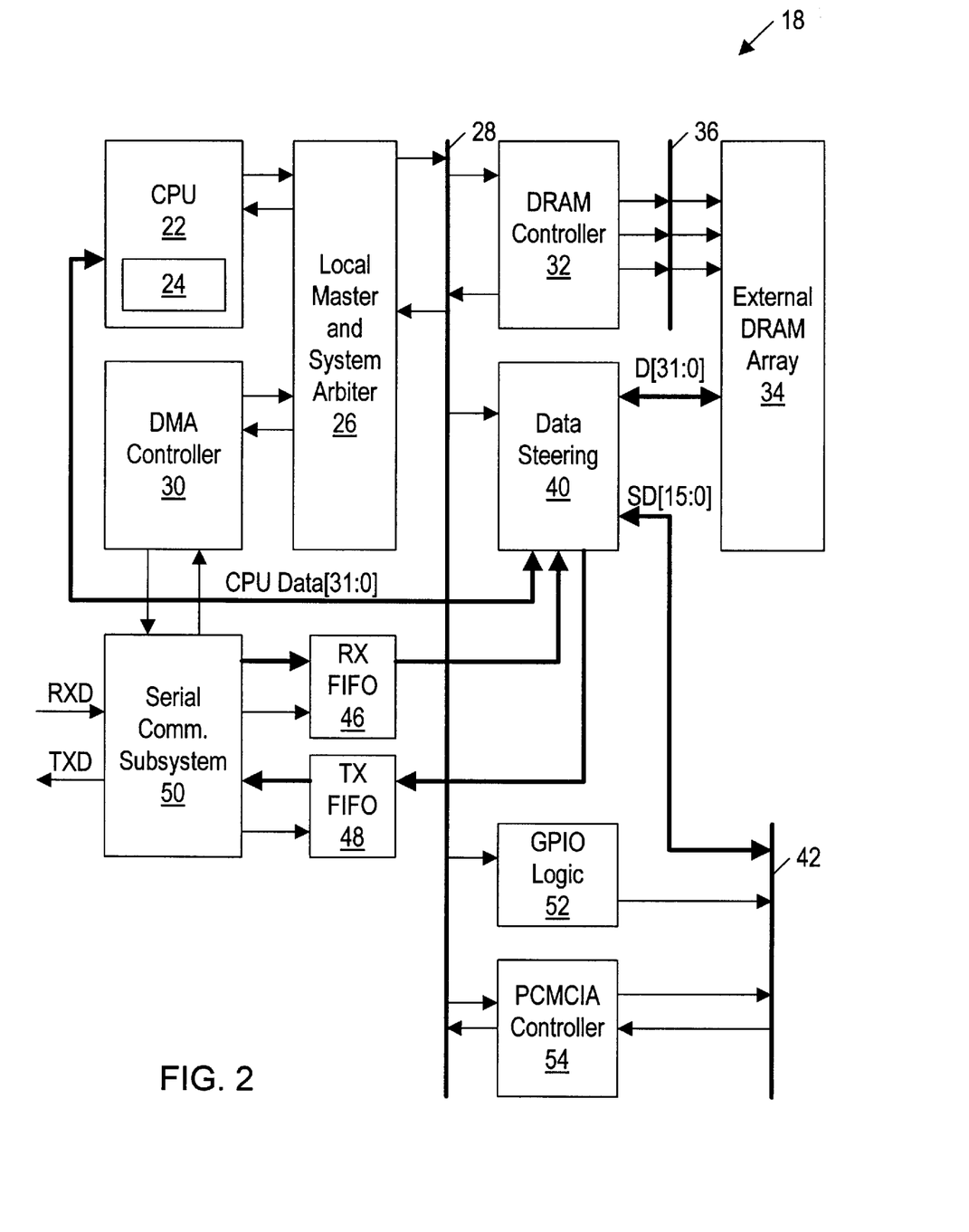
FIG. 2 is a block diagram of communications subsystems embodied within the router of FIG. 1.

Referring now to FIG. 2, a block diagram of communication logic 18 is shown according to one embodiment hereof. Communication logic 18 preferably comprises an embedded communications processing system. As shown, communication logic 18 includes a local CPU 22. CPU 22 includes an internal or external cache system 24, according to one embodiment. The cache system 24 included with CPU 22 is found in, for example, microprocessors employing the x486 architecture. If desired, however, local CPU 22 need not have a cache system 24. Such processors include the earlier versions of, for example, the 8088, 8086, or '188/' 186 architectures.

CPU 22 couples to a local master and system arbiter logic 26. Arbiter 26 couples to an internal bus 28, herein referred to as the local system bus. Arbiter 26 performs arbitration functions for controlling access to system bus 28. In so doing, arbiter 26 performs bus mastering functions.

A direct memory access (DMA) controller 30 is coupled to arbiter 26. DMA controller 30 performs direct memory access operations. Thus, DMA controller operates through local master 26 to perform transfers between devices on system bus 28 without requiring host/local CPU intervention. More specifically, DMA controller 30 allows access to memory by data routed from a communication port (via steering logic) without requiring transfer operations be performed by CPU 22.

Communication logic 18 also preferably includes a memory controller 32 which couples to system bus 28. Memory controller 32 is adapted for coupling to memory array 34. As shown, memory 34 is preferably a dynamic random access memory (DRAM) array. Thus, memory controller 32 is preferably a DRAM controller. As shown, a DRAM interface 36 may be included between controller 32 and DRAM array 34. DRAM array 34 is preferably a memory comprising a plurality of memory banks.

Also coupled to system bus 28, along with DRAM controller 32, is a data steering logic block 40. Data steering block 40 couples to a PCMCIA/ROM external bus 42. External bus 42 provides an interface for PC cards which are compatible with a PCMCIA standard. External bus 42 also provides an interface for read only memory (ROM). Data steering logic 40 also couples through a data path to the external DRAM array. Data steering logic yet further couples to CPU 22, as well as to receive FIFO device (RX FIFO) 46 data and to transfer FIFO (TX FIFO) 48 data.

Data steering logic 40 operates by manipulation of and data path transfers. Those transfers allow each device within system 18 to operate using a single DRAM array 34. Data steering logic 40 can therefore selectively couple, or "steer" data between DRAM array 34 and various devices operably linked to system bus 28. Those devices are shown to include CPU 22, RX FIFO 46, TX FIFO 48 and PCMCIA/ROM external bus 42. Based upon control signals sent to data steering logic 40 via system bus 28, data path between bus masters and the DRAM array 34 is reconfigurable.

Communication system 18 includes a serial communication subsystem 50. Serial communication subsystem provides a serial communication interface to external communication media. As discussed above, router 12 can provide an ISDN interface through PSTN 16. Thus, serial communication subsystem 50 is preferably an ISDN interface. As shown, serial communication subsystem 50 includes a receive data input (RXD) and a transfer data output (TXD). Serial communication subsystem 50 is coupled to provide receive data to the receive FIFO 46. The receive FIFO 46 in turn provides data to steering logic 40. Serial communication subsystem 50 is also coupled to receive data from transfer FIFO 48. In an alternative embodiment, receive FIFO 46 and transfer FIFO 48 may be coupled directly to system bus 28.

Communication system 18 preferably includes general purpose input/output (GPIO) logic 52. GPIO logic 52 is coupled to system bus 28 and also couples to the PCMCIA/ROM external bus 42. GPIO logic 52 provides general purpose input/output operations between external bus 42 and the internal bus 28. GPIO logic 52 can therefore be programmed to receive input data or transmit output data in accordance with, for example, control indicia within a reconfigurable register. Storage of input data is provided by a storage register, for example. Further provided with communication system 18 is a PCMCIA controller 54. Controller 54 is coupled between system bus 28 and external bus 42. PCMCIA controller 54 provides a PCMCIA standard interface for PC card devices, such interface being relatively known to the skilled artisan.

The general operation of communication system 18 is somewhat evident from the particular arrangement shown in FIG. 2. CPU 22 is operable to perform transfers to and from the DRAM array 34 via, for example, data steering logic 40. Transfers are effectuated by a request signal forwarded onto the bus. The bus request signal can be, for example, the BREQ signal, known to the x486 architecture. The bus request signal has a first state which indicates a request for use of system bus 28. A second state also exists which indicates no request for use of that bus. The second state may be present if, for example, CPU 22 is retrieving data from cache system 24 rather than from DRAM array 34. Also coupled to system bus 28 are various buffers used within the communication data path. For example, buffer 46 may be a FIFO buffer capable of generating varying priority DMA transfer requests conducive to preventing, for example, overflow errors (or underruns) from occurring.

One purpose of DMA controller 30 is to provide, if applicable, control signals to memory controller 32 via system bus 28. DMA controller 30 performs those transfers in response to requests from respective requesting devices. DMA controller 30 preferably includes a first input which receives varying priority DMA transfer request. Depending upon the priority, DMA controller 30 initiates a DMA transfer only if the CPU bus request signal is in a proper state and bus 28 is otherwise not being utilized.

Communication system 18 also includes bus arbiter 26 operable to control access to system bus 28. Bus arbiter 26 serves to acknowledge, for example, varying priority DMA transfer request. For example, bus arbiter 26 may grant access preferably only when no other request are pending and the CPU 22 is not currently using the bus.

Figure 3:
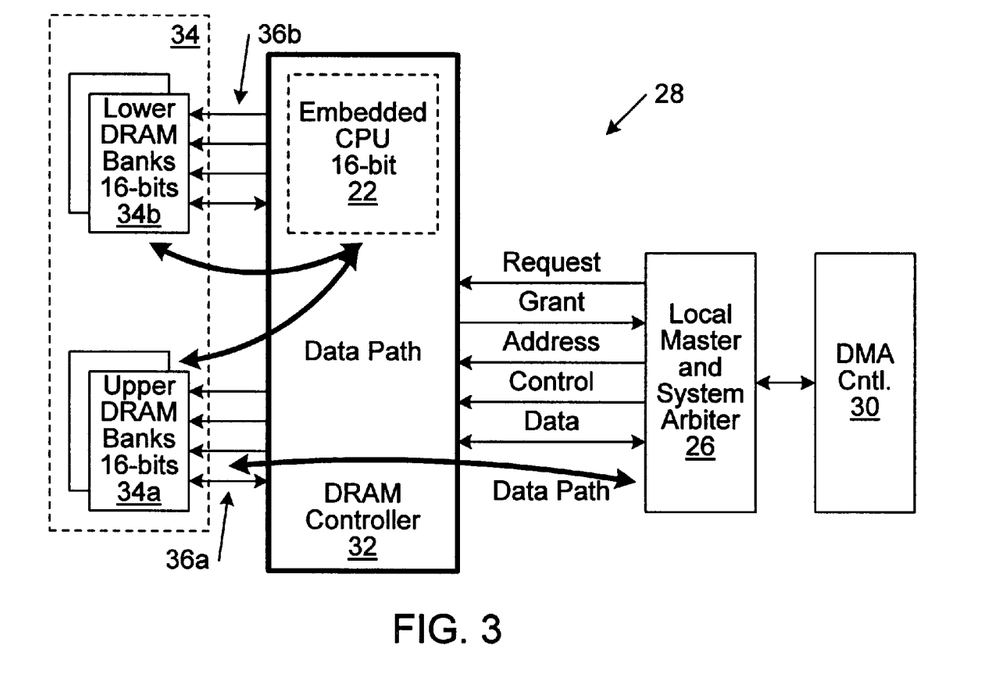
FIG. 3 is a block diagram of concurrent data flow accorded by a DRAM controller illustrated in one embodiment of the present invention.
Figure 4:
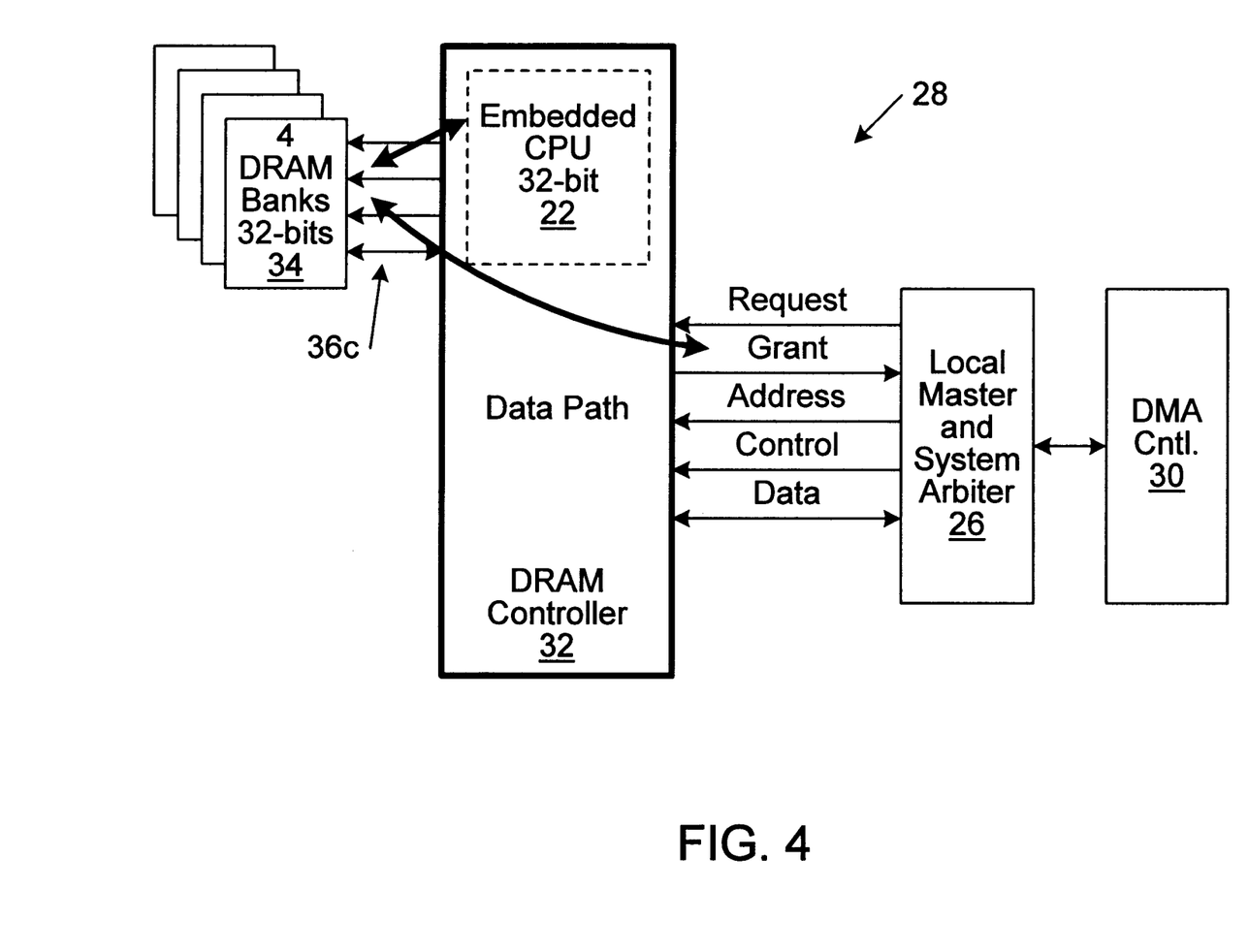
FIG. 4 is a block diagram of non-concurrent data flow accorded by a DRAM controller illustrated in one embodiment of the present invention.

Referring to FIGS. 3 and 4 in combination, details regarding the various data flow paths to and from DRAM array 34 are shown. FIG. 3 depicts concurrent access of DRAM array 34 by both local CPU 22 as well as DMA controller 30. Concurrent access is achieved by utilizing a 16-bit microprocessor, i.e., a microprocessor which utilizes 16-bit architecture or 16 data lines. The 16-bit CPU is dedicated to address the lower memory banks 34b concurrent with DMA access of the upper memory banks 34a. The memory banks not being addressed by CPU 22 can then be accessed by DMA controller 30. In the embodiment shown, CPU 22 accesses lower memory bank 34b, while either CPU 22 or DMA controller 30 accesses upper memory bank 34a. Local accesses to memory banks 34 preferably occur via data steering logic 40 (shown in FIG. 2). Deciding which master will access upper memory bank 34a depends upon the various arbitration schemes set forth above. In a simple example, DMA controller 30 requests mastership, whereby arbiter 26 forwards a request signal to processor 22. Once processor 22 receives the request and asserts a grant signal, arbiter 26 then recognizes mastership to DMA controller 30. DMA controller can thereafter forward address and control signals directly to the upper memory banks 34a of DRAM memory 34. Data can then follow from the communication port via data steering logic 40.

FIG. 3 is provided to illustrate how DRAM controller 32 controls the various memory banks of DRAM array 34. Further explanation as to the details regarding concurrent accesses and the various addressing and control signals 36a and 36b sent to upper and lower banks 34a and 34b, respectively, will be described in further detail in reference to FIG. 5. For sake of brevity, signals 36a and 36b, in each instance, include a set of multiplexed address signals, a row address strobe ($\overline{RAS}$), a column address strobe ($\overline{CAS}$) and a write enable signal ($\overline{WE}$). Those signals are indicative of the four sets of signals 36a and 36b interposed between DRAM controller 32 and each of the upper and lower memory banks 34a and 34b.

FIG. 4 illustrates an alternative mode of operation in which non-concurrent accesses to DRAM array 34 take place. Thus, instead of both a local CPU and a DMA controller accessing memory 34 at the same time, the embodiment of FIG. 4 allows for only CPU access and not DMA access, or vice versa. Separate, or non-concurrent, accessing may be sufficient when the performance is enhanced by using a 32-bit microprocessor rather than a 16-bit microprocessor. Most modern microprocessors employ 32-bit architecture. Further, since those processors generally have an internal cache, accesses from the CPU are limited relative to earlier 16-bit processors which do not have internal cache. Thus, the embodiment shown in FIG. 4 does not require as many CPU accesses to external memory as that shown in FIG. 3, and therefore concurrency may not be as critical. Similar to that shown in FIG. 3, addressing and control signals 36c are interposed between memory 34 and DRAM controller 32. However, instead of arbiter 26 arbitrating for only the upper memory banks 34a, as in FIG. 3, arbiter 26 in FIG. 4 must arbitrate for the entirety of all banks within memory 34. The arbitration scheme is similar to that shown in FIG. 3, whereby a request signal is dispatched by arbiter 26 and a grant signal is received to allow DMA controller to forward address and control signals. In response to the control signals dispatched, data is either read from or written to memory 34.

Figure 5:
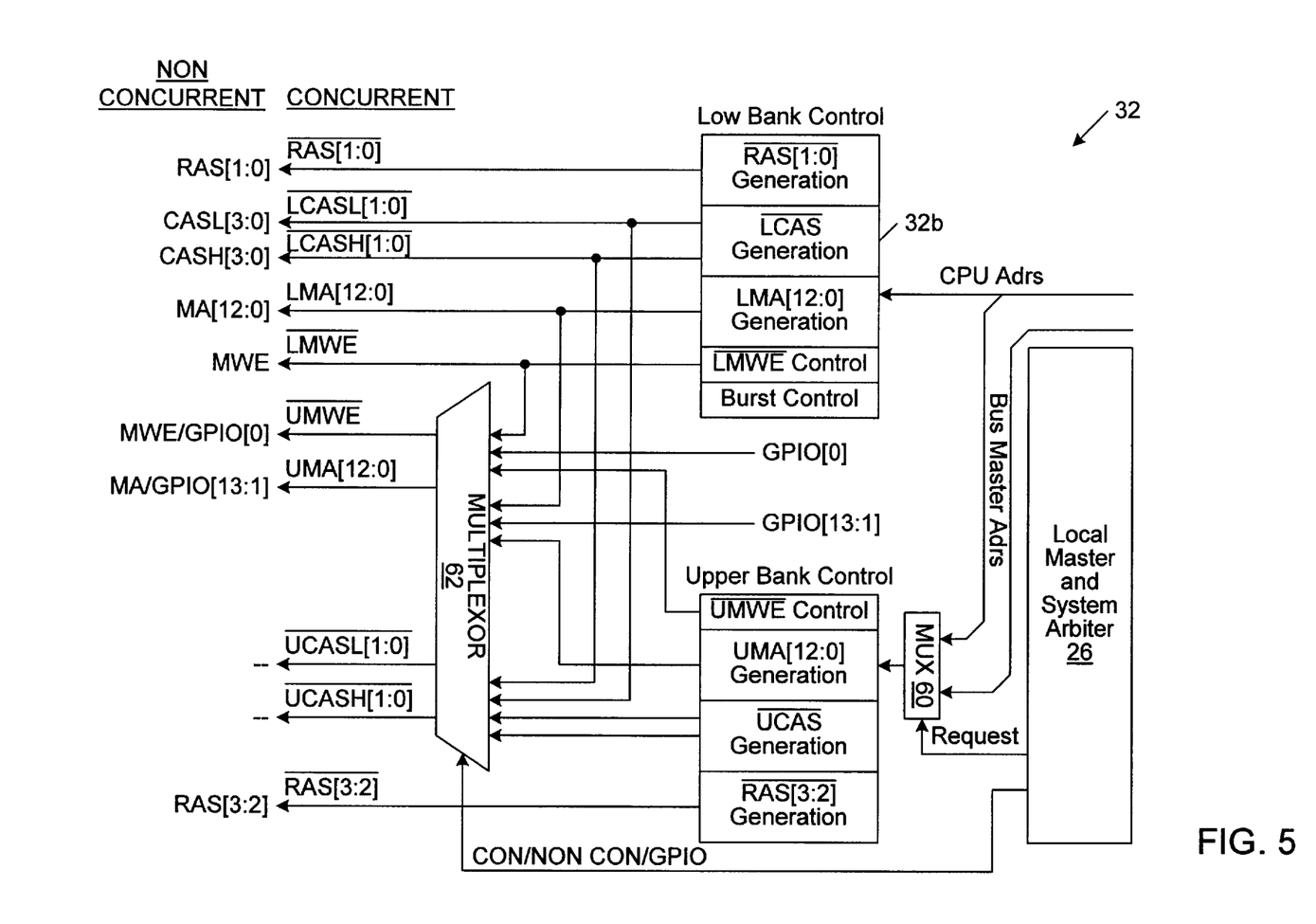
FIG. 5 is a block diagram of the DRAM controller configured in accordance with the embodiments of FIGS. 3 and 4.

FIGS. 3 and 4 depict DRAM controller 32; however, it is understood that the data path need not extend through the controller. Instead, data is transferred through a data steering logic block in response to control and address signals forwarded to DRAM controller 32. Illustration of data flow through controller 32 is only for sake of explanation, and is not indicative of actual data flow therethrough. Thus, FIGS. 3 and 4 serve only to describe data flow between bus masters used in controlling memory accesses. FIG. 5 illustrates in further detail the operation of DRAM controller 32 in accordance with the embodiments shown in FIGS. 3 and 4. Illustrated in FIG. 5 is DRAM controller 32 comprising a lower memory bank controller 32b and an upper memory bank 32a. Both lower and upper memory bank controllers 32b and 32a, respectively, are configured to receive address signals and, responsive to those signals, forward specific upper/lower address and control signals to respective banks of memory array 34. The control signals are defined as row/column strobe signals and write enable signals shown in FIG. 5 as $\overline{RAS}$, $\overline{CAS}$ and $\overline{MWE}$. Lower and upper memory bank controllers 32b and 32a also dispatch address signals which are typically multiplexed onto the row latch decoder followed by column latch decoder of the selected memory bank. The operation of DRAM controller 32 shown in FIG. 5 will be described with reference to two modes of operation: a concurrent mode of operation followed by a non-concurrent mode.

Concurrent mode of operation dictates that the local CPU address the lower memory banks 34b concurrent with possibly another bus master (i.e., DMA controller) accessing the upper memory banks 34a. Selection as to which master (CPU or DMA) will access the upper memory banks is dependent upon the operation of multiplexer 60. Multiplexer 60 is configured to receive both the CPU address signals as well as the DMA controller address signals. Selection of which signals to forward to upper memory bank controller 32a is dependent upon the status of a select signal. For example, if a request signal is forwarded from arbiter 26, the request signal indicates a request for DMA controller mastership of the system bus. This corresponds to priority being given to the DMA controller so that the DMA can access DRAM memory 34. Responsive to that request, multiplexer 60 grants mastership to the DMA controller to allow the upper memory bank controller 32a to assert its control signals upon upper memory banks 34a. The various control and address signals forwarded to DRAM memory 34 are illustrated in FIG. 5 in reference to concurrent operation. The data path of concurrent operation is shown in FIG. 3. When the CPU accesses the lower memory banks 34b and when either the CPU or the DMA accesses the upper memory banks 34a, various control signals are presented to those respected banks. The control signals attributed to the lower memory banks and arising from the lower memory bank controller 32b are attributed to the lower banks, and shown as $\overline{RAS}$, $\overline{LCASL}$|H and $\overline{LMWE}$. Signal RAS refers to row address strobe signal. Since there are two signals associated with this strobe signal, RAS can select one of the two lower memory banks as shown in FIG. 3. Given the selection provided by RAS, the memory bank chosen can be further addressed according to either a lower-addressed byte or a higher-addressed byte. For example, $\overline{LCASL}$ indicates selection of a lower-address 8-bit byte from the 16-bit wide plurality of words within each of the lower memory banks. Conversely, $\overline{LCASH}$ controls selection of the higher-address 8-bit byte within the 16-bit wide lower memory bank. Given the control provided by RAS, and either $\overline{LCASL}$ and $\overline{LCASH}$, particular locations within selected row and column can be addressed by the LMA signals. The LMA, or lower memory address, is shown, according to one exemplary embodiment, to contain 13 signals.

Also associated with the lower memory controller is a write enable signal, denoted as $\overline{LMWE}$. When asserted, lower memory banks 34b can be written to from an external source. According to the concurrent mode of operation, the external source is the local CPU. The upper memory bank controller 32a functions similar to the lower memory bank controller 32b except that multiplexer 60 allows either the CPU or another bus master to obtain access. The control and addressing signals forwarded from upper memory bank controller 32a, however, are similar to those forwarded from the lower memory bank controller 32b. The only difference being that the control and addressing signals are presented to multiplexer 62 instead of being fed directly to the respective memory banks. Depending upon the status of multiplexer 62 selection, either the upper memory bank controller output, the lower memory bank controller output, or a general purpose input/output is output from multiplexer 62. For example, if the concurrent mode of operation is selected by arbiter 26, a concurrent (CON) signal will be forwarded to the selector pin of multiplexer 62. The concurrent signal indicates passage of controller 32a output to upper memory banks 34a. However, if non-concurrent (NON CON) is selected, multiplexer 62 forwards output from controller 32b to the upper memory banks 34a. Still further, if the general purpose input/output is selected, GPIO signal is forwarded to multiplexer 62 to allow the multiplexer's output to be used as general purpose I/O signals.

A description of how memory banks of a DRAM operate helps illustrate the significance of the various control signals, and addressing signals on each of the various upper and lower memory banks. Typically, a DRAM memory bank contains an array of memory cells which are accessed by a multiplexed addressed input. During access, a row address is presented to the multiplexed addressed inputs. As the row address strobe signal $\overline{RAS}$ goes low, the address is latched into the row latch and decoded to the memory array. There, the outputs from the selected row are presented to the sense amplifiers within the array.

At this time, the row address can be replaced by a column address. When the column address is valid, the column address strobe signal $\overline{L|UCAS}$ goes low to latch the address into the column latch of the respective lower or upper memory bank. Column addresses are decoded to allow a selected sense amplifier to send data to the output data latch during a read cycle. In a write cycle, with the write enable signal $\overline{L|UMWE}$ of the respective lower or upper memory bank already low, a low going $\overline{CAS}$ signal causes the selected cell to be set to the value at the data input.

The key feature of DRAM operation is that $\overline{RAS}$ internally controls $\overline{CAS}$. When $\overline{RAS}$ is already low and $\overline{CAS}$ goes low, a normal read or write cycle follows. This simplifies bank selection by using different RAS outputs to select the banks. For example, in a four bank system, only one $\overline{RAS}$ goes low in any access cycle. This activates all the addressed cells in a selected bank, but does not activate cells in the other three banks. These later RAM cells remain in the standby mode. Alternatively, multiple $\overline{RAS}$ signals can be active simultaneously so that more than one page is open.

As shown in FIG. 5, $\overline{RAS}$ includes two signals associated with the lower banks and two signals associated with the upper banks. Thus, row address strobe can select which bank of the upper bank pairs as well as which bank of the lower bank pairs to access via a subsequent $\overline{L|UCAS}$ signal. Each column address strobe signal is attributed to an 8-bit byte, and more specifically, to whether the lower byte or upper byte should be selected. Also, there exists different column address strobe signals associated with the lower memory banks, i.e., $\overline{LCAS}$ separate from the upper memory banks. Therefore, each column address strobe signal selects a particular byte of the selected upper or lower memory bank.

During non-concurrent operations, at least some control signals and the addressing signals forwarded from the upper memory bank controller 32a are disabled. Since these signals will now be driven from the lower memory bank 32b, all transfers are initiated by arbiter 26 once it has determined the owner of the current bus cycle (i.e., either the CPU or bus master/DMA controller). Pin multiplexing during non-concurrent operation is controlled by arbiter 26 according to two options. First, a generalized memory address MA[12:0] is generated by the lower memory bank controller 32b. Connection to the other memory banks of the four memory banks is accomplished by selection through multiplexer 62. Thus, no modification to external DRAM circuitry is required to convert controller 32 from concurrent to non-concurrent operation. This may be efficient in systems which employ small width DRAMs (i.e., 1M×4) which results in significant capacitive loading. An alternative method for performing address connection is that the memory banks normally associated with the upper two banks be physically connected to the lower memory banks so that a generic memory address signal MA[12:0] exists for all four memory banks. Physical connection of two memory bank address signals to the other two memory bank address signals allows non-concurrent data flow such as that shown in FIG. 4. This connotes certain disadvantages as well as advantages. However, that connection frees up what was normally the upper memory address lines and the upper memory write enable line for use with general purpose I/O signals (GPIOs). As shown in FIG. 5, GPIO signals consist of a total of 14 signals, according to one embodiment. Thirteen of those signals are multiplexed onto what was previously upper memory address signals, and the remaining GPIO signal is multiplexed onto what was previously the upper memory write enable signal. Physically connecting the upper and lower DRAM memory addresses allows use of what was previously the UMA signals to be used for GPIO signals.

It follows that physical connection of the upper and lower DRAM memory addresses may also allow physical connection of the upper and lower DRAM memory write enable signals, resulting in a generic MWE signal. What was previously UMWE can now be used as one signal line of GPIO.

Selection of concurrent, non-concurrent or GPIO-configured modes of operation is performed in part at multiplexer 62. Thus, multiplexer 62 can configure, with no external modification, operation of controller 32 either in concurrent mode or non-concurrent mode. However, if physical connection between upper and lower memory address signals as well as upper and lower write enable signals occurs then multiplexer 62 can be selected to output GPIO where upper memory address and upper memory write enable signals pre-existed.

It is important to note that the lower column address strobe $\overline{LCAS}$ and upper column address strobe $\overline{UCAS}$ comprise two signals each. Those signals are needed to select possibly two separate lower or upper bytes within a 32-bit data word if non-concurrent operation is selected. Thus, the upper four $\overline{CAS}$ signals required by the additional two bytes of the 32-bit data word are controlled by the lower memory bank controller 32b $\overline{CAS}$ generators. Those signals are forwarded according to the byte enables from the CPU or the lower two address bits from the bus master (or DMA controller). Multiplexer 62 automatically disables the $\overline{CAS}$ signals from the upper memory bank controller 32a.

FIG. 5 illustrates the various signals dispatched from controllers 32a and b depending upon whether concurrent or non-concurrent mode of operation is selected. The mode of operation is primarily mandated by the type of local CPU 22 being used. It is important to note that local CPU 22 can, if desired, be embedded within DRAM controller shown in FIGS. 3 and 4.

It will be appreciated to those skilled in the art having the benefit of this disclosure that this invention is believed to be capable of achieving separate and distinct data flow paths. Those flow paths are mandated in part by the configuration of the CPU either 16-bit or 32-bit CPU. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A system, comprising:

a memory array including an upper memory bank and a lower memory bank;

a CPU coupled to said memory array;

a bus master device coupled to said memory array; and a memory controller coupled to said CPU, to said bus master device, and to said memory array, wherein said memory controller operates in a first mode to transfer data between the CPU and the lower memory bank concurrently with transferring data between said upper memory bank and said bus master device, and in a second mode said memory controller operates to transfer data between said upper and lower memory banks and said CPU nonconcurrently with transferring data between said upper and lower memory banks and the bus master device;

a system arbiter coupled to said CPU and to said bus master device; wherein in said first mode said system arbiter arbitrates between said CPU and said bus master device for access to said upper memory bank and wherein in said first mode said CPU has dedicated access to said lower memory bank and in a second mode said system arbiter arbitrates for access to said upper and lower memory banks between said CPU and said bus master device.

2. The system as recited in claim 1, further comprising:

a system arbiter coupled to said CPU and to said bus master device;

wherein in said first mode said system arbiter arbitrates between said CPU and said bus master device for access to said upper memory bank, and said CPU has dedicated access to said lower memory bank; and wherein in said second mode said system arbiter arbitrates between said CPU and said bus master device for access to the memory array.

3. The system as recited in claim 1, wherein in said first mode data is transferred between said memory array and said CPU at a first data width, and in said second mode data is transferred between said memory array and said CPU at a second data width, wherein said second data width is twice said first data width.

4. The system as recited in claim 1, wherein said bus master device comprises:

a serial communications device for receiving and sourcing said data transfers between said upper memory bank and said bus master device; and a DMA controller for initiating said data transfers between said upper memory bank and said bus master device.

5. The system as recited in claim 4, wherein said serial communications device is adapted for connecting to a public switched telephone network (PSTN).

6. The system as recited in claim 4, wherein said serial communication device is adapted for transferring data to or from a remote computer system.

7. A memory controller, comprising:

a lower memory bank controller for providing data access to a lower memory bank; and an upper memory bank controller for providing data access to an upper memory bank;

wherein in a first mode said lower memory bank controller is dedicated to data accesses from a first device, and said upper memory bank controller provides data accesses for said first device and a second device; and wherein in a second mode said lower memory bank controller and said upper memory bank controller operate together to provide access to both said lower and upper memory banks for accesses from said first device and for accesses from said second device.

8. The memory controller as recited in claim 7, wherein in said first mode said lower memory bank controller provides access for said first device to said lower memory bank concurrently with said upper memory bank controller providing access for said second device to said upper memory bank, and in said second mode the memory controller provides access for said first device to said lower and upper memory banks non-concurrently with providing access for said second device to said lower and upper memory banks.

9. The memory controller as recited in claim 7, wherein in said first mode said lower memory bank controller provides access to said lower memory bank at a first data width and said upper memory bank controller provides access to said upper memory bank at said first data width, and wherein in said second mode the memory controller provides access to said lower and upper memory banks together at a second data width, wherein said second data width is twice said first data width.

10. The memory controller as recited in claim 7, further comprising a control signal multiplexer receiving lower memory bank control signals from said lower memory bank controller and receiving upper memory bank control signals from said upper memory bank controller, wherein in said first mode said control signal multiplexer provides said upper memory bank control signals to said upper memory bank, and wherein in one setting of said second mode said control signal multiplexer provides said lower memory bank control signals to said upper memory bank.

11. The memory bank controller as recited in claim 10, wherein said lower and upper memory bank control signals include memory address signals, a memory write enable signal, and column address strobe (CAS) signals.

12. The memory controller as recited in claim 10, wherein said control signal multiplexer further receives general purpose input/output (GPIO) signals, and wherein in a second setting of said second mode said control signal multiplexer outputs said GPIO signals.

13. A method for accessing a memory array including a lower and an upper memory bank, the method comprising:

in a first mode providing dedicated access to the lower memory bank for a first device, arbitrating for access to the upper memory bank between said first device and a second device, and transferring data between said lower memory bank and said first device concurrently with transferring data between said upper memory bank and said second device; and in a second mode arbitrating for access to said lower and upper memory banks between said first device and said second device, and transferring data between said lower and upper memory banks and said first device non-concurrently with transferring data between said lower and upper memory banks and said second device.

* * * * *

UNITED STATES PATENT AND TRADEMARK OFFICE
CERTIFICATE OF CORRECTION

PATENT NO. : 5,996,051
DATED : November 30, 1999
INVENTOR(S) : James O. Mergard

It is certified that error appears in the above-identified patent and that said Letters Patent is hereby corrected as shown below:

Title page,

Item [54], line 3, after the word "MEMORY" please delete "ACCESES" and substitute therefor --ACCESSES and col. 1, line 3.

Signed and Sealed this

Twenty-seventh Day of June, 2000

Attest:

Q. TODD DICKINSON

*Attesting Officer*    *Director of Patents and Trademarks*